United States Patent Office

3,732,320
Patented May 8, 1973

3,732,320
PROCESS FOR PURIFYING ETHYLENE GLYCOL
Fred Austin Ford, Lake Charles, La., assignor to Cities Service Company, New York, N.Y.
No Drawing. Continuation of application Ser. No. 625,902, Mar. 6, 1967, which is a continuation-in-part of application Ser. No. 483,854, Aug. 30, 1965. This application Nov. 18, 1969, Ser. No. 871,687
Int. Cl. C07c 29/24; C08g 17/06
U.S. Cl. 260—637 R    8 Claims

ABSTRACT OF THE DISCLOSURE

A process for reducing the iron content of ethylene glycol by treatment with a cation exchange resin operating in the acid cycle. Products can be obtained which meet fiber grade glycol specifications as to both iron content and titratable acidity.

CROSS-REFERENCE TO RELATED APPLICATION

This application is a continuation of now abandoned Ser. No. 625,902, filed Mar. 6, 1967, which in turn is a continuation-in-part of now abandoned Ser. No. 483,854, filed Aug. 30, 1965.

BACKGROUND OF THE INVENTION

(1) Field of the invention

This invention relates to a process for the purification of a polyhydric alcohol, ethylene glycol (Cl. 260/637).

(2) Description of the prior art

It is known to prepare ethylene glycol by oxidizing ethylene and subsequently hydrolyzing the resultant ethylene oxide. Because of the severe reaction conditions employed in the process and the corrosive nature of many of the by-products, the glycol so obtained generally contains trace amounts of certain metals, including iron. The presence of trace amounts of iron and other metals does not affect the usefulness of ethylene glycol as an antifreeze, but is a serious problem when the ethylene glycol is to be used in the manufacture of polyester fibers, e.g. polymeric terephthalate esters. The iron content of fiber-grade ethylene glycol must be below about 0.20 part per million parts of glycol by weight, and preferably below about 0.15 p.p.m. Furthermore, the acid content of ethylene glycol marketed for use in the manufacture of polyester fibers should not exceed about 50 parts per million parts of glycol by weight. Efforts in the past to meet these specifications have been directed primarily toward prevention of contamination by the use of corrosion resistant materials in the manufacture and storage of ethylene glycol. No commercially practicable method has been described in the prior art for meeting these specifications by the purification of glycol containing unacceptably high iron levels.

Cation exchange resins operating in the acid cycle have been widely used to reduce alkali and alkaline earth metal ion concentrations in glycerin and sugars, as exemplified by U.S. Pats. 2,615,924 and 2,463,677. Because of the highly acidic nature of these resins, the removal of alkali and alkaline earth metal ions is accompanied by a marked reduction in the pH of the glycerin or sugar solution. This increase in product acidity is often utilized to monitor the effectiveness of the exchange process and thereby determine when regeneration of the resin is necessary.

SUMMARY

In accordance with the present invention, a reduction in the trace iron content of ethylene glycol, as well as other advantages, are achieved by contacting the ethylene glycol with a cation exchange resin operating in the acid cycle. It has been found unexpectedly that the cation exchange treatment of ethylene glycol removes iron and other metallic contaminants present in trace amounts without increasing the acidity of the purified product. In fact, a reduction in the acidity of ethylene glycol typically results from the purification process provided by the invention. It is a specific object of the invention to provide a simple one-step process for reducing the iron content, without detriment to other properties, of ethylene glycol. Purified ethylene glycol can be produced by the instant process which meets all of the specifications required for use in the manufacture of polyester fibers.

DESCRIPTION OF THE PREFERRED EMBODIMENTS

In the practice of this invention, impure ethylene glycol contaminated with trace quantities of iron is contacted with a cation exchange resin operating in the acid cycle and purified ethylene glycol of reduced iron content and substantially unchanged or decreased titratable acidity is recovered. The titratable acidity of the glycol, which does not significantly influence the operability of the process, is believed to be due primarily to the presence of acetic, propionic, acrylic, oxalic and similar free acids. This titratable acidity is reported as acetic acid and is determined by titrating the glycol sample with a standard solution of sodium hydroxide to the phenolphthalein end point.

Typical of the well known cation exchange resins that are suitable for this purpose are those containing sulfonic acid radicals, such as the sulfonated phenol-formaldehyde resins and the sulfonated polystyrene resins, and polystyrene carboxylic acid resins. The sulfonated polystyrene resins prepared by subjecting a polystyrene cross-linked with from about 4% to about 8% of divinylbenzene to sulfuric acid sulfonation are particularly preferred. Ordinarily, such cation exchange resins are obtained from the manufacturer in the form of small spherical beads (20 to 100 mesh) containing up to 50% water. These resins may be employed in this condition, saturated with additional water or dried by any conventional means, such as by contacting the resin with substantially anhydrous ethylene glycol. Glycol swollen resins which have been dried in this manner are advantageously employed to reduce the iron content of substantially anhydrous impure glycols without increasing their water content.

The contacting of ethylene glycol with the acidic cation exchange resin may be accomplished, for example, simply by passing the ethylene glycol through a vertically elongated bed of resin. While significant reductions in iron content of the glycol can be detected after a few seconds contact with a swollen resin, it is generally advantageous to adjust the volume of the resin bed and the glycol flow rate to provide a retention time of at least about ½ minute, and preferably from about 1 to about 40 minutes in order to lower the iron concentration to fiber grade specification. Retention times of 25 to 40 minutes or more may, of course, be employed but are generally required only when the resin is approaching exhaustion or the iron content of the impure glycol is very high. The temperature of the operation is not particularly important and conveniently may be ambient temperature.

The impure ethylene glycol may be employed in substantially anhydrous form or in aqueous solution and may contain as much as 200 p.p.m. of iron or more. Significant reductions in iron content can be effected in glycols containing as little as about 0.07 p.p.m. iron. When the desired product is one which meets fiber grade glycol specifications as to water, iron and titratable acidity, it is often possible and advantageous to use a substantially anhydrous commercially available antifreeze grade ethylene glycol. Such material typically contains from about 0.2 to about 1.5 p.p.m. of iron, with rare samples having an iron content as low as about 0.15 p.p.m. or as high as 2 to 15 p.p.m. The iron content of these antifreeze grade glycols is readily reduced to a value below about 0.15 p.p.m. by the cation exchange treatment of this invention without substantially increasing the titratable acidity. In fact, the acidity is generally lowered somewhat. Thus, further purification operations to reduce acidity to fiber grade specifications is unnecessary when the process of this invention is applied to antifreeze grade glycols having a titratable acidity of 0 to 50 p.p.m. and is often unnecessary when the acidity of such glycols is as high as 80 to 100 p.p.m.

Although not wishing to be bound thereto, a possible explanation for the unexpected reduction in the acidity of ethylene glycol due to cation exchange treatment is that the highly acidic resin catalyzes an esterification reaction between a small amount of ethylene glycol and the weak organic acids typically present therein, such as acetic, propionic, acrylic, oxalic and the like. Regardless of the actual chemical mechanism involved, the reduction in acidity obtained by the present process is very desirable in that low acidity, in addition to low iron content, is a requirement of ethylene glycol used for polyester fiber manufacture. Typically, the titratable acidity (as acetic acid) of commercial antifreeze grade ethylene glycol which has been purified by the process of this invention is below about 35 p.p.m.

The following specific non-limiting examples are presented to further illustrate the invention:

EXAMPLE I

A sulfonated polystyrene cation exchange resin cross-linked with 8% divinylbenzene and saturated with deionized water was introduced into a 1 inch I.D. glass tube provided with a 70 mesh screen and glass wool plug at the bottom for resin support. The resin bed settled to a depth of 20 inches giving a wet volume of about 250 ml. Excess water was drained from the column until the water level just covered the top of the bed.

The water-saturated resin was dried by introducing impure ethylene glycol containing about 0.04 wt. percent water into the top of the column under nitrogen pressure from a stainless steel reservoir. The flow rate of ethylene glycol through the ion exchange column was maintained at 10.5 ml./min., thereby enabling a retention time of approximately 25 minutes on the bed based on superficial linear velocity. After about 2.5 liters of ethylene glycol were passed through the water-saturated resin bed, the effluent was observed to contain less than about 0.3% water.

The flow rate of ethylene glycol through the cation exchange resin dried in the manner described above was maintained at 10.5 ml./min., and the resultant product (40 liters total) was recovered and analyzed.

The analyses of the ethylene glycol before and after cation exchange treatment are compared with typical specifications for "fiber-grade" glycol in Table I below:

TABLE I

| Text | Impure ethylene glycol | Purified ethylene glycol | Fiber grade specifications |
|---|---|---|---|
| Glycol content, percent wt. | 99.7 | 99.8 | [1] 99.6 |
| Boiling range, ° F. | 383–393 | 381–396 | 376–397 |
| Water, percent wt. | 0.04 | 0.01 | [2] 0.03 |
| Titratable acidity (as acetic acid) p.p.m. | 35 | 21 | [2] 50 |
| Ash, p.p.m. | 5–10 | 1 | [2] 50 |
| Odor | [3] | [3] | [3] |
| Color, APHA | 5 | 5 | [2] 10 |
| Chlorides, p.p.m. | 0.09±0.05 | 0.03±0.05 | [2] 0.1 |
| Iron, p.p.m. | 0.8±0.1 | 0.07±0.02 | [2] 0.15 |
| Sulfate, p.p.m. | 0.1 | 0.1 | 1 |
| Suspended matter | Free | Free | Free |

[1] Minimum.
[2] Maximum.
[3] Mild.

It will be noted from the above tabulation that cation exchange treatment resulted in an ethylene glycol effluent having a glycol content of 99.8% compared to 99.7% for the impure material. It will also be noted that cation exchange treatment reduced the ion content of ethylene glycol to a value well within fiber-grade specifications. In addition, substantial reductions in the acidity and ash content of ethylene glycol were obtained as a result of the process. The recovered product was in all respects an acceptable fiber-grade ethylene glycol.

EXAMPLE 2

Example 1 was repeated except that a sulfonated poly- 20.8, 31.2, 52.0, 104 and 177 ml./min. through the previously dried cation exchange resin, thereby providing retention times of 12, 8, 4.8, 2.4 and 1.4 minutes, respectively. The purified products were substantially equivalent to the ethylene glycol product of Example 1.

EXAMPLE 3

Example 1 was repeated except that a sulfonated polystyrene resin cross-linked with 4% divinylbenzene was employed as a cation exchange resin. The purified effluent was characterized by iron, ash and acidity contents well within fiber-grade specifications.

EXAMPLE 4

Example 1 was repeated except that the impure ethylene glycol was diluted with an equal volume of deionized water and the resin drying step was omitted. The iron and titratable acidity levels of the product were, after correction for differences in water content, substantially equivalent to those of Example 1.

In general, the cation exchange resins may be used to treat ethylene glycol until the iron content of the resin increases to about 3% to 4% by weight. The exhausted resin may then be regenerated by a number of suitable procedures. In accordance with one suitable regeneration procedure, the exhausted resin is (1) flushed with water to remove glycol, (2) contacted with dilute sulfuric acid, (e.g. 20 wt. percent) to remove iron and other metallic ions and replace them with hydrogen ions and then (3) rinsed with deionized water to remove excess acid.

It will, of course, be understood that various changes may be made in the embodiments which have been referred to above to describe the invention without departing from the spirit and scope of the invention as expressed in the appended claims.

I claim:
1. Method for removing iron from impure ethylene glycol without increasing the titratable acidity of said ethylene glycol which consists of contacting said ethylene glycol with a cation exchange resin operating in the acid cycle for at least about one-half minute and separating from said resin ethylene glycol of reduced iron, said im- pure ethylene glycol being prepared by the hydrolysis of ethylene oxide and having an iron content from about 0.15 p.p.m. to about 15 p.p.m. and containing a weak organic acid selected from the group consisting of acetic, propionic, acrylic and oxalic acid.

2. Method as in claim 1 wherein said cation exchange resin operating in the acid cycle is a sulfonated polystyrene resin.

3. Method as in claim 1 wherein said impure ethylene glycol has an iron content of from about 0.2 to about 1.5 p.p.m. and a titratable acidity of from 0 to about 100 p.p.m.

4. Method as in claim 3 wherein the titratable acidity of said impure ethylene glycol is decreased during contact with said resin.

5. Method for removing iron from impure ethylene glycol without increasing the titratable acidity of said ethylene glycol which consists of passing said ethylene glycol through a bed of cation exchange resin operating in the acid cycle, the retention time on the resin bed being at least about one-half minute, and separating from said resin purified ethylene glycol having an iron content of less than about 0.15 p.p.m. and a titratable acidity of less than about 50 p.p.m., said impure ethylene glycol being prepared by the hydrolysis of ethylene oxide and having an iron content from about 0.15 p.p.m. to about 15 p.p.m. and containing a weak organic acid selected from the group consisting of acetic, propionic, acrylic and oxalic acid.

6. Method as in claim 5 wherein said cation exchange resin is a sulfonated polystyrene cross-linked with from about 4% to about 8% divinylbenzene.

7. Method as in claim 5 wherein the retention time of ethylene glycol on the cation exchange resin bed is from about 1 minute to about 40 minutes.

8. Method of claim 5 wherein said impure ethylene glycol is substantially anhydrous.

References Cited

UNITED STATES PATENTS

| | | | |
|---|---|---|---|
| 2,463,677 | 3/1949 | Brandner | 260—637 A |
| 2,792,344 | 5/1957 | Tidwell | 260—643 F |
| 2,628,986 | 2/1953 | Wallace et al. | 260—643 F |
| 2,615,924 | 10/1952 | Reents | 260—637 A |
| 3,341,609 | 9/1967 | Kasehagen | 260—637 |
| 3,040,104 | 6/1962 | Sarappo et al. | 260—637 |
| 2,788,373 | 4/1957 | Mills et al. | 260—637 |
| 2,793,235 | 5/1957 | Jenkinson | 260—637 |

FOREIGN PATENTS

| | | | |
|---|---|---|---|
| 470,663 | 1/1951 | Canada | 260—637 |

OTHER REFERENCES

Baker, "Laboratory Chemicals," (1966), p. 42.

Nachod, et al., "Ion Exchange Technology," (1956), pp. 554 to 559.

LEON ZITVER, Primary Examiner

J. E. EVANS, Assistant Examiner

U.S. Cl. X.R.

260—75 R